US010697195B2

(12) United States Patent
Pearson

(10) Patent No.: US 10,697,195 B2
(45) Date of Patent: Jun. 30, 2020

(54) EXTENDIBLE ENCLOSURE

(71) Applicant: Jason Pearson, West Midlands (GB)

(72) Inventor: Jason Pearson, West Midlands (GB)

(*) Notice: Subject to any disclaimer, the term of this patent is extended or adjusted under 35 U.S.C. 154(b) by 0 days.

(21) Appl. No.: 15/755,075

(22) PCT Filed: Aug. 24, 2016

(86) PCT No.: PCT/GB2016/052623
§ 371 (c)(1),
(2) Date: Feb. 24, 2018

(87) PCT Pub. No.: WO2017/033006
PCT Pub. Date: Mar. 2, 2017

(65) Prior Publication Data
US 2018/0245737 A1 Aug. 30, 2018

(30) Foreign Application Priority Data
Aug. 24, 2015 (GB) .................................. 1514990-9

(51) Int. Cl.
E04H 15/36 (2006.01)
A01K 1/03 (2006.01)
A01K 31/06 (2006.01)
F16P 1/02 (2006.01)
F16M 3/00 (2006.01)

(52) U.S. Cl.
CPC ............. *E04H 15/36* (2013.01); *A01K 1/034* (2013.01); *A01K 31/06* (2013.01); *F16M 3/00* (2013.01); *F16P 1/02* (2013.01)

(58) Field of Classification Search
CPC ............................ E04H 15/52; Y10S 135/906

USPC .................................. 135/128, 129, 97, 906
See application file for complete search history.

(56) References Cited

U.S. PATENT DOCUMENTS 1,449,428 A * 3/1923 McGaffee ............... A01K 31/18
119/494
3,030,973 A * 4/1962 Janda ....................... B63C 15/00
105/15

(Continued)

FOREIGN PATENT DOCUMENTS

GB          03974 A      11/1909

OTHER PUBLICATIONS

EPO, International Search Report and Written Opinion of the International Searching Authority issued in parent International Patent Application No. PCT/GB2016/052623 dated Nov. 29, 2016, 8 pages.

*Primary Examiner* — Noah Chandler Hawk
(74) *Attorney, Agent, or Firm* — Laura M. King; Matrix Law Group, LLP

(57) ABSTRACT

The present invention provides an extendible enclosure, having a first frame member supporting a first mesh canopy and a second frame member supporting a second mesh canopy. A sliding mechanism coupling the first frame member to the second frame member is operable to reversibly extend the enclosure between a first contracted position and a second extended position, where the first frame member is configured to slidingly engage with the second frame member so that the second frame member at least partially nests within the first frame member when in the first contracted position. The extendible enclosure is particularly suited for objects such as tools, equipment and machinery.

18 Claims, 6 Drawing Sheets

(56) References Cited

U.S. PATENT DOCUMENTS

| | | | | |
|---|---|---|---|---|
| 3,729,890 | A | * | 5/1973 | Yamamoto ................ B66C 7/00 104/246 |
| 3,845,591 | A | * | 11/1974 | Stine ................... E04B 1/34305 135/129 |
| 4,140,080 | A | | 2/1979 | Snader |
| 4,844,109 | A | * | 7/1989 | Navarro .................... E04H 6/04 135/129 |
| 5,005,896 | A | * | 4/1991 | Li ........................... B60J 7/062 135/129 |
| 5,469,807 | A | | 11/1995 | Kosmaczeska |
| 5,634,638 | A | * | 6/1997 | Havens ................ A63B 71/022 135/128 |
| 5,960,744 | A | * | 10/1999 | Rutman ............... A01K 1/0245 119/473 |
| 6,688,256 | B1 | * | 2/2004 | King ................... A01K 1/0245 119/474 |
| 7,228,820 | B1 | * | 6/2007 | Kellogg .................. A01K 1/03 119/498 |
| 8,141,517 | B2 | * | 3/2012 | Shimoda ................ A01K 1/034 119/473 |
| 9,745,080 | B2 | * | 8/2017 | Gutkuhn ................ B64F 1/305 |
| 2003/0145882 | A1 | * | 8/2003 | Sanna ..................... B60J 7/026 135/128 |
| 2009/0264209 | A1 | | 10/2009 | Labarge, III |

\* cited by examiner

EXTENDIBLE ENCLOSURE

CROSS-REFERENCE TO RELATED APPLICATIONS

The present Application is a national stage of International Patent Application No. PCT/GB2016/052623, titled "An Extendible Enclosure," filed Aug. 24, 2016, which claims priority from Great Britain Patent Application No. 1514990.9 titled "An Extendible Flexible Enclosure," filed Aug. 24, 2015, the contents of which are incorporated in this disclosure by reference in their entirety.

BACKGROUND OF THE INVENTION

The present invention relates to enclosures for objects such as tools, equipment and machinery, and in particular to an extendible enclosure which can be varied in size.

It is commonly known to place cages, guards or other forms of enclosures around tools, equipment and machinery for safety and/or security reasons. Moving parts of equipment or machinery can pose a potential hazard for users or passers-by, and so it is always desirable to prevent access to the equipment or machinery to avoid harm. In addition, many pieces of machinery generate heat, and indeed some devices, such as space heaters or hot air blowers etc., are specifically intended to provide a flow of hot air to the environment in which they are located. In such applications, it is therefore also very desirable to prevent inadvertent access to the heater or touching of the surfaces of the heater to avoid burns etc.

For similar reasons, it is also useful to enclose electrical generators and welding inverter equipment, as in addition to possible moving parts and hot components, electrical current flows may pose electric shock risks if a person inappropriately comes into contact with the equipment.

To avoid such risks, many manufacturers of equipment provide bespoke cages to fit the machinery or device, which although serve to avoid contact with the equipment are limited to only that specific machinery or device. Therefore, to consistently ensure safety, it is usually necessary to purchase a bespoke cage for every tool or piece of machinery, which may be prohibitively expensive if there is a large amount of equipment to enclose.

Moreover, if the equipment is subsequently updated or replaced, it is normally the case that the original bespoke cage will now no longer fit, and so a further cage will usually be required to be purchased. The equipment owner then has the option to either, not replace the cage (and potentially jeopardise health and safety) or face the prospect of a further expensive outlay to ensure that safety is maintained.

SUMMARY OF THE INVENTION

It is therefore an object of the present invention to mitigate or overcome the above drawbacks and problems in the art and to provide a safe and reliable device for enclosing tools, equipment and machinery.

According to an aspect of the present invention there is provided an extendible enclosure, comprising:
 a first frame member supporting a first mesh canopy;
 a second frame member supporting a second mesh canopy; and
 a sliding mechanism coupling the first frame member to the second frame member and operable to reversibly extend the enclosure between a first contracted position and a second extended position,
 wherein the first frame member is configured to slidingly engage with the second frame member so that the second frame member at least partially nests within the first frame member when in the first contracted position.

The provision of an extendible enclosure comprising a first frame member that can slidingly engage with a second frame member, via a sliding mechanism operable to reversibly extend the enclosure between a first contracted position and a second extended position, so that the second frame member at least partially nests within the first frame member when in the contracted position is found to be particularly advantageous, as the enclosure can be varied in size to accommodate any object therein.

Therefore, the extendible enclosure of the present invention provides a "universal fit" for different sizes and types of tools, equipment and machinery, which avoids the need for separate bespoke cages and enclosures. Consequently, the extendible enclosure can be used for multiple applications, and is thus not restricted or limited to only one particular use or specific task.

The extendible enclosure of the present invention comprises a first frame member supporting a first mesh canopy, and a second frame member supporting a second mesh canopy. In preferred embodiments, the first and second frame members are similar in form and are essentially mirror images of the other. Both frame members preferably have an open, skeletal-like structure, which is preferably formed from a mild steel tubing.

However, it is be understood that the frame members may be formed from any suitable rigid material, while both frame members need not be identical in all embodiments.

In preferred embodiments, the frame members define side and bottom faces that are open apertures. An advantage of having such an 'open' structure is that it allows air flow around the object to be maintained, which is particularly important, if the object is a space heater or hot air blower etc. In addition, the open structure reduces the overall weight of the enclosure, while also allowing the enclosed object to be visually inspected during use.

The absence of a bottom face or surface to the enclosure also always the enclosure to be placed over and on top of the object to be enclosed.

The first and second mesh canopies are preferably fabricated from the same mesh, ideally a metal mesh and preferably having a mesh spacing of about 50 mm×50 mm squares. Of course, any suitable mesh or gauze or rigid wire netting may be used as the mesh canopy in the present invention, and the mesh size (i.e. mesh spacing) may be dimensioned according to the particular application and/or implementation. In some embodiments, it may be preferable to have a fine mesh spacing (e.g. 10 mm×10 mm, or less), whereas in other embodiments are larger mesh spacing (e.g. above 50 mm×50 mm) may be better suited.

The respective mesh canopies preferably extend over most of the first and second frame members, and essentially define a cage-like structure for each frame member—with the end and bottom faces being open, i.e. the mesh canopy preferably does not cover the end or bottom faces of each frame member.

However, in alternative embodiments, the mesh canopy may cover all of the faces of the frame members, so as to define a completely enclosed cage-like enclosure.

Clearly, the function of the mesh canopy is to prevent access to the enclosed object, while still allowing visual inspection of the object and enabling air to circulate around the object.

Although the first and second frame members are preferably mirror images of each other, the first mesh canopy is preferably dimensioned so as to be slightly larger than the second mesh canopy. The reason for this is that the first mesh canopy may then receive and accommodate the second mesh canopy, when the enclosure is contracted to its first contracted position (this will be discussed in more detail below).

The first frame member is coupled to the second frame member by a sliding mechanism, which is operable to reversibly extend the enclosure between a first contracted position and a second extended position. By "first contracted position" we mean a situation whereby the enclosure has been contracted to its smallest longitudinal dimension, which corresponds to an arrangement where the second frame member at least partially, and most preferably fully, nests within the first frame member. In such an arrangement, the first mesh canopy then preferably overlies the second mesh canopy, and the volume enclosed by the enclosure adopts its minimum value.

Conversely, by "second extended position" we mean a situation whereby the enclosure has been extended to its largest longitudinal dimension, which corresponds to an arrangement where the second frame member and the first frame member are at their maximum separation. In such an arrangement, the first mesh canopy and the second mesh canopy are preferably arranged end-to-end, with little or no overlap therebetween. The volume enclosed by the enclosure then adopts its maximum value.

Of course, it is to be appreciated that the enclosure of the present invention can assume any state between the first contracted position and the second extended position by virtue of the sliding mechanism and so the enclosure can be extended or contracted to whatever size the particular application requires.

In preferred embodiments, the sliding mechanism comprises a pair of tubular members, each tubular member slidingly engaging with the first frame member and the second frame member. By "tubular" we mean a tube-like structure, which is preferably circular in cross-section, but may also be taken to include square, rectangular, triangular and polygonal cross-sections, without limitation.

Preferably, the first frame member and the second frame member are configured to receive each tubular member in a respective guide, rail or runner. Each guide, rail or runner preferably extends substantially along the longitudinal (i.e. extension) axis of the enclosure. Therefore, both the first and second frame members are preferably fabricated to include a channelled groove on each side of the frame to receive a respective tubular member in sliding engagement—the groove serving as the guide, rail or runner.

Alternatively, the tubular members may be received into the tubular structure of the frame members themselves, such that the tubular members can slide within the frame members, such that the frame member itself serves as a guide for the tubular members of the sliding mechanism.

Each tubular member preferably comprises at least one locking mechanism to lock the first frame member in a position relative to the second frame member. Preferably, the locking mechanism comprises at least one bolt or stud and a wing nut, which is tightened against the guide, rail or runner to lock the tubular member in a position relative to the first or second frame member to inhibit or prevent further sliding motion. Most preferably, each tubular member comprises at bolt and wing nut at each end, so that the first and second frame members can be rigidly locked in place.

In another embodiment, the sliding mechanism comprises a third tubular member arranged to slidingly engage with the first frame member and the second frame member. The third tubular is preferably disposed towards the uppermost part of the enclosure, adjacent to the first and second mesh canopies. An advantage of having a third tubular member is that it provides additional structural strength to the top of the enclosure, and mitigates against damage to the mesh canopies. The third tubular member preferably has the same construction as the other two tubular members and the first and second frame members can be modified to include a respective additional guide, rail or runner to receive the third tubular member in sliding engagement.

It should be appreciated that the enclosure can be sized or scaled to whatever application or implementation is required. However, in an exemplary embodiment, the longitudinal dimension (i.e. along the extension axis) may range from about 50 cm to about 120 cm, and most preferably, from about 57 cm to about 111 cm.

To facilitate portability and maneuverability of the enclosure, at least one of the first and second frame members may comprise a pair of wheels or castors, and most preferably 2 castors and 2 supporting feet members to receive the castors. In some embodiments, both the first and second frame members comprise wheels or castors, while in other embodiments, only one of the frame members has wheels or castors. It may also be the case that neither of the frame members comprise wheels or castors, particularly in situations where the enclosure is intended to remain static for long periods when deployed.

Of course, the enclosure is not limited to wheels or castors, and may alternatively or additionally include rollers or some other means of translating the enclosure across a floor surface.

A further possibility is that at least one of the mesh canopies may comprise a pivotable flap, hatch or door to allow additional access to the interior of the enclosure. The flap, hatch or door could, for example, allow an authorised operator to change an operational state of the enclosed equipment or machinery (e.g. to switch it on or off). In a preferred embodiment, the mesh canopies will comprise a flap, hatch or door on both sides of the canopy.

It is to be appreciated that none of the embodiments or examples described in relation to the present invention are mutually exclusive, and therefore the features and functionality of one embodiment or example may be used interchangeably or additionally with the features and functionality of any other embodiment or example without limitation.

BRIEF DESCRIPTION OF THE DRAWINGS

Embodiments of the present invention will now be described in detail by way of example and with reference to the accompanying drawings in which.

DETAILED DESCRIPTION OF PREFERRED EMBODIMENTS

Figure 1:
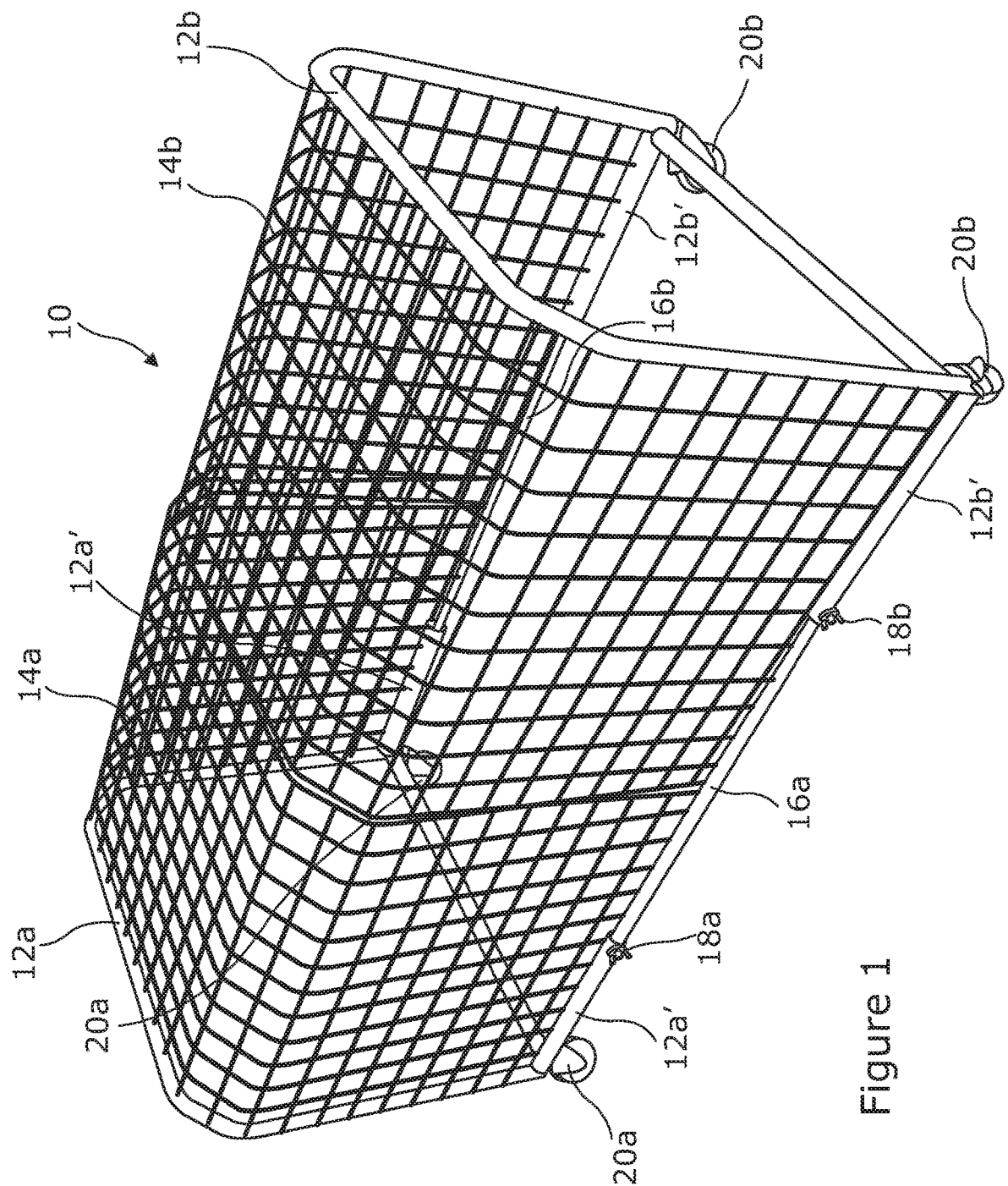
FIG. 1—shows an approximate side perspective view of an extendible enclosure when fully extended according to a preferred embodiment.

Referring to FIG. 1, there is a shown a particularly preferred embodiment of an extendible enclosure 10 according to the present invention.

The enclosure 10 comprises a first frame member 12a supporting a first mesh canopy 14a and a second frame member 12b supporting a second mesh canopy 14b. The first and second frame members 12a, 12b are essentially mirror images of each other, and each defines an open, skeletal-like structure which is formed from a mild steel tubing (e.g. 19 mm OD×1.5 mm SWG ERW Tube).

In the example of FIG. 1, the frame members 12a, 12b define a substantially square frame with lower longitudinal supports 12a', 12b' extending perpendicularly therefrom. The square frames define the "end faces" of the enclosure, although as will be appreciated from FIG. 1, the end faces are open.

The mesh canopies 14a, 14b are essentially arch-shaped cages, which follow the cross-sectional form defined by the square-shaped frame members 12a, 12b. The canopies are fabricated from a 50 mm×50 mm wire mesh, which is welded to each respective frame member 12a, 12b along its edge. Therefore, the combination of the frame members 12a, 12b and the mesh canopies 14a, 14b define the outer shape of the enclosure, and consequently the shape and magnitude of the volume enclosed therein.

Although the first and second frame members 12a, 12b are mirror images of each other, the first mesh canopy 14a is dimensioned so as to be slightly larger than the second mesh canopy 14b. The reason for this is that the first mesh canopy 14a may then receive and accommodate the second mesh canopy 14b, when the enclosure 10 is contracted, as shown in FIG. 2 (this will be discussed in more detail below).

Figure 2:
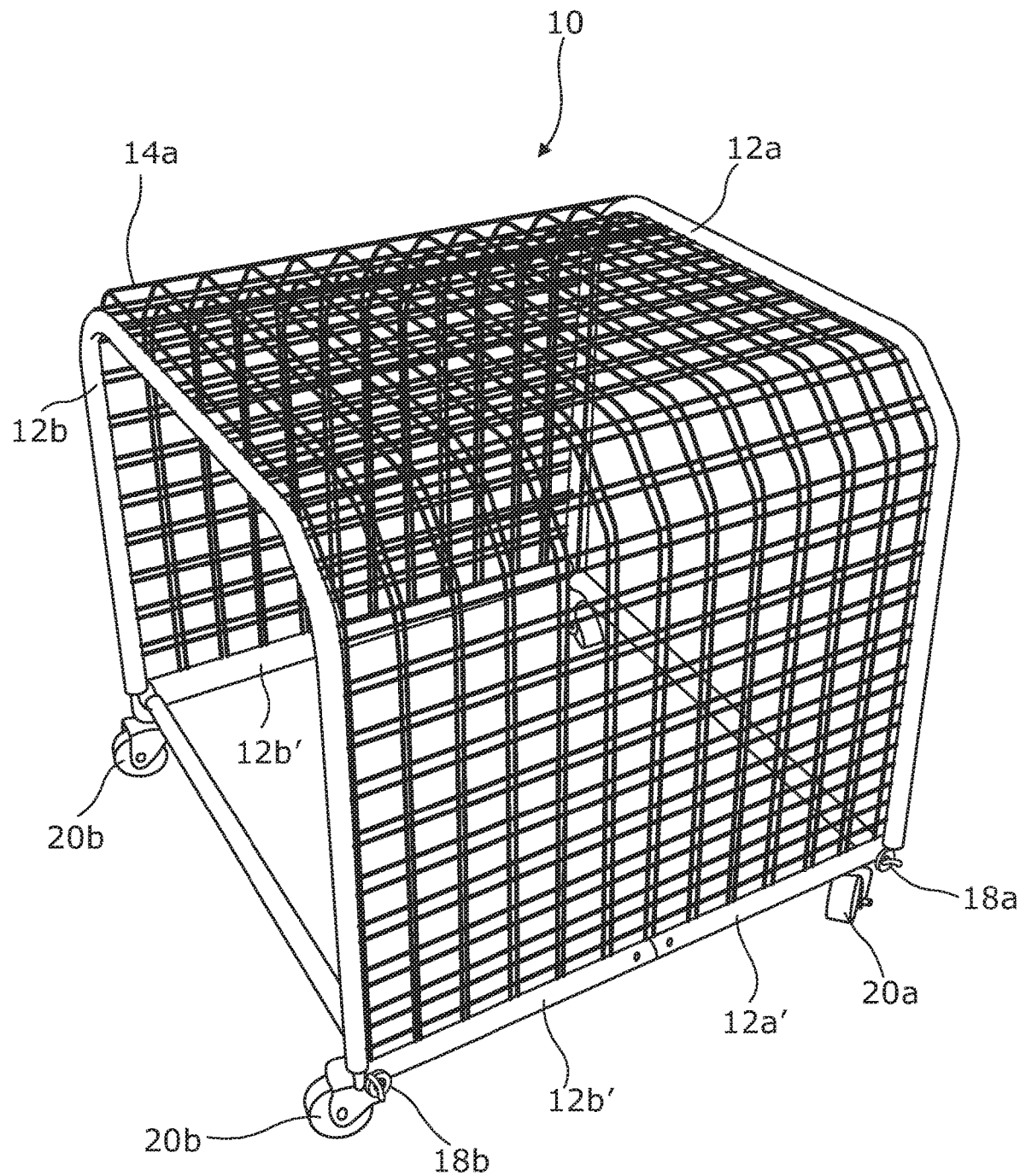
FIG. 2—shows an approximate side perspective view of the extendible enclosure of FIG. 1 when fully contracted.

The first frame member 12a is coupled to the second frame member 12b by a sliding mechanism, which is operable to reversibly extend the enclosure 10 between a contracted position (as shown in FIG. 2) and an extended position (as shown in FIG. 1).

The sliding mechanism comprises a pair of tubular members 16a, 16b, each tubular member engaging in sliding arrangement with the longitudinal supports 12a' of the first frame member 12a and the longitudinal supports 12b' of the second frame member 12b. The longitudinal supports 12a', 12b' serve as guides or rails to receive the respective tubular members 16a, 16b, as shown in FIGS. 1 and 2. In the example of FIG. 1, the tubular supports are fabricated from steel tube (e.g. 1"×⅞" with a 5/16 gap in HRPO tubing).

Referring again to FIG. 1, the enclosure 10 is shown in its fully extended state, whereby the enclosure has been extended to its largest longitudinal dimension, which corresponds to an arrangement where the first frame member 12a and the second frame member 12b are at their maximum separation. In such an arrangement, the first mesh canopy 14a and the second mesh canopy 14b are arranged end-to-end, with little or no overlap therebetween. The volume enclosed by the enclosure then adopts its maximum value.

By contrast, in FIG. 2 the enclosure 10 is shown as having been contracted to its smallest longitudinal dimension, which corresponds to an arrangement where the second frame member 12b fully nests within the first frame member 12a. In such an arrangement, the first mesh canopy 14a then overlies the second mesh canopy 14b, and the volume enclosed by the enclosure adopts its minimum value.

In the example of FIGS. 1 and 2, the enclosure 10 therefore adopts a substantially rectangular cuboid form when extended; and a substantially cuboid form when contracted. When extended, the longitudinal dimension is around 111 cm, while when contracted the longitudinal dimension is about 57 cm.

Of course, it is to be appreciated that due to action of the sliding mechanism, the enclosure 10 can adopt any extended state between the contracted position and the fully extended position, so as to accommodate any volume therein. The extendibility of the enclosure 10 therefore allows the enclosure to be used for many different applications, and as such can be used to enclose all manner of tools, equipment and machinery of varying sizes. Moreover, the ability to contract the enclosure 10 also assists with ease of storage of the enclosure when not in use.

Each tubular member 16a, 16b comprises at least one locking mechanism 18a, 18b to lock the first frame member 12a in a position relative to the second frame member 12b. In the example of FIGS. 1 and 2, the locking mechanism 18a, 18b comprises at least one bolt and a wing nut, which is tightened against the respective longitudinal supports 12a', 12b' to lock the tubular member 16a, 16b in a position relative to the first or second frame member 12a, 12b to inhibit or prevent further sliding motion.

As shown in FIGS. 1 and 2, each tubular member 16a, 16b comprises a bolt and a 8 mm wing nut at each end, so that the first and second frame members 12a,12b can be rigidly locked in place.

The first and second frame members 12a, 12b also comprise a pair of castors 20a, 20b to facilitate portability and maneuverability of the enclosure 10, while also allowing ease of extension and contraction. In the example of FIGS. 1 and 2, a 65 mm single bolt hole swivel castor has been used at each corner of the enclosure 10.

Figure 3:
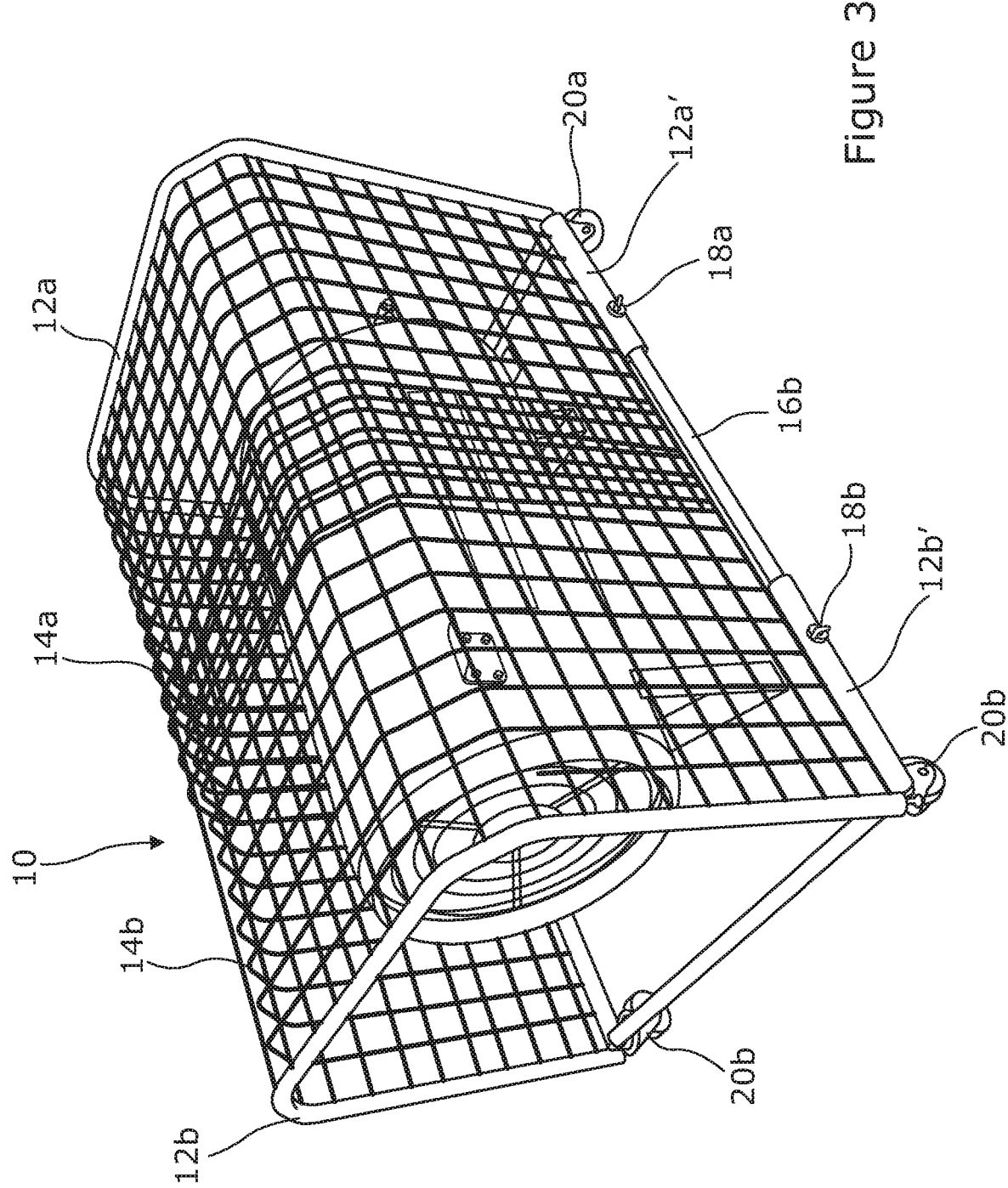
FIG. 3—shows the extendible enclosure of FIG. 1 in use with an example piece of equipment.
Figure 4:
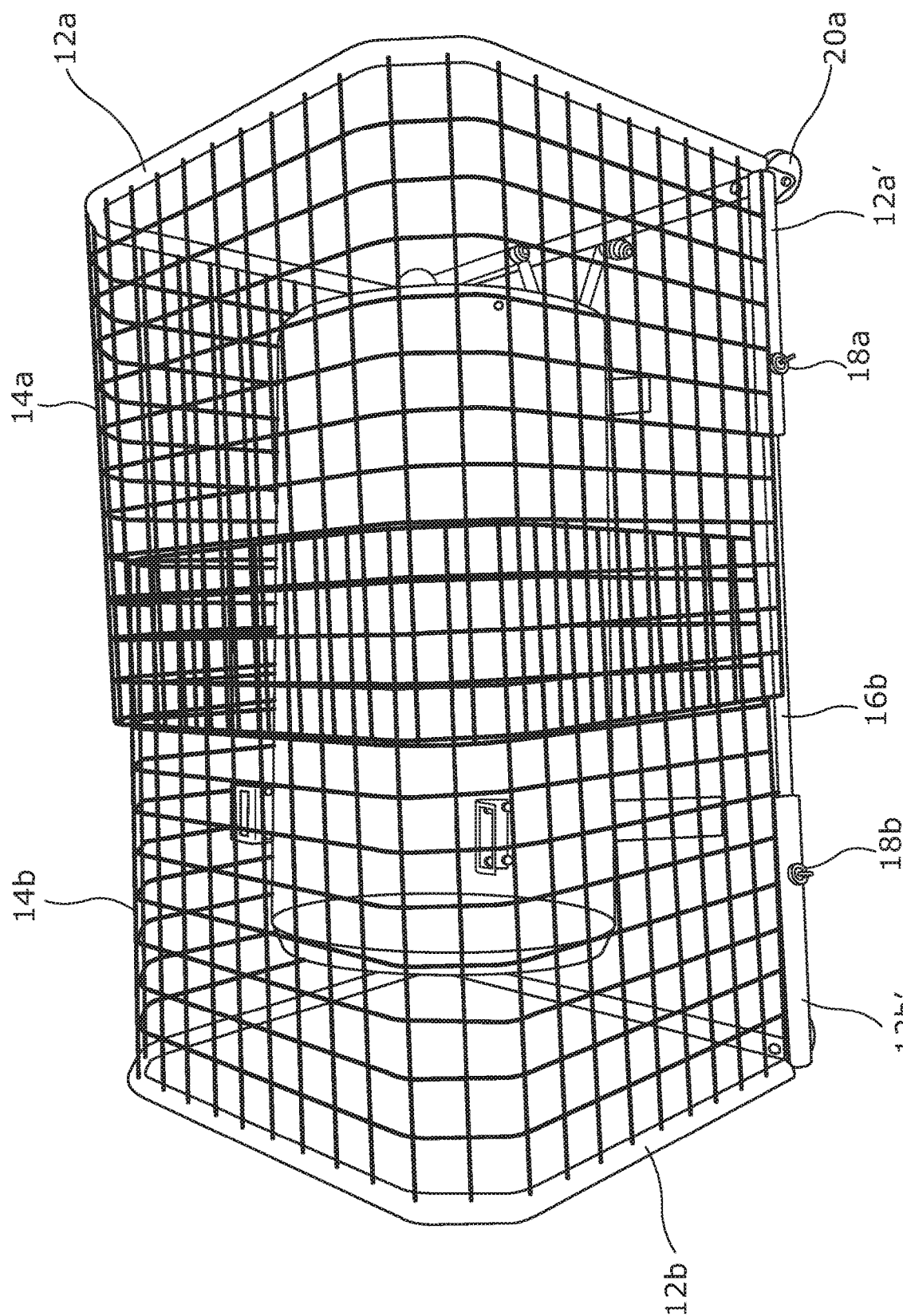
FIG. 4—shows the same extendible enclosure of FIG. 3 from above.

Referring now to FIGS. 3 and 4, there is shown an enclosure 10 according to the present invention in use with an example piece of equipment, in this case, a space heater. Due to the presence of heated surfaces and hot air flow, it is desirable to prevent inadvertent access to the heater. Therefore, the enclosure 10 can be extended to the required size and placed over the heater to avoid any harm or injury. Moreover, since the ends of the enclosure 10 are open and the "surfaces" of the enclosure 10 are formed by mesh canopies 14a, 14b, the circulation of air flow is not impeded and so the heater can perform it required function, without concern of injury to a user or passer-by.

Of course, it is to be appreciated that the space heater is just one of many examples of possible items of equipment or machinery that could be enclosed by the present enclosure.

Figure 5:
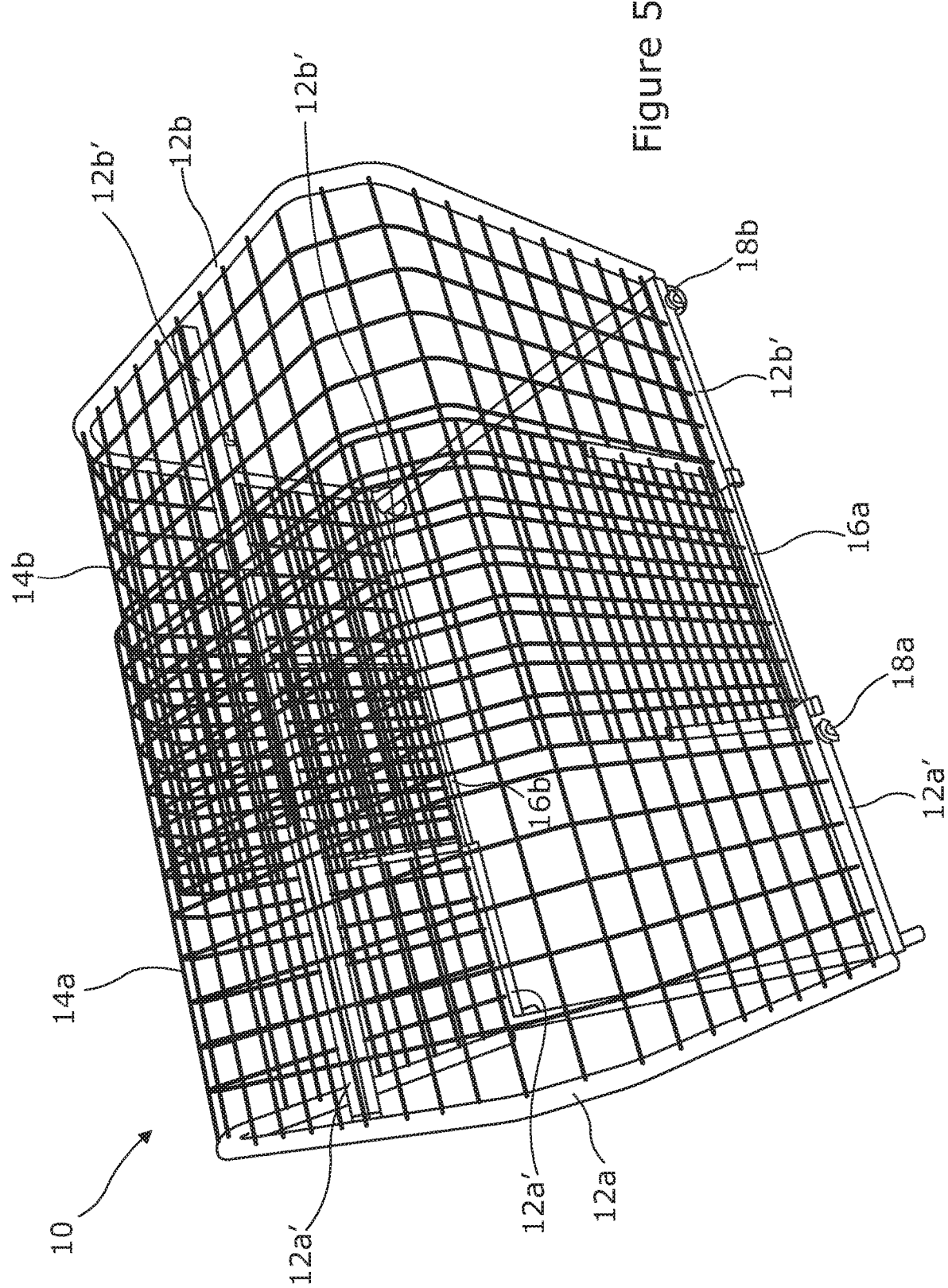
FIG. 5—shows an approximate side perspective view of another extendible enclosure when partially extended according to a different preferred embodiment.
Figure 6:
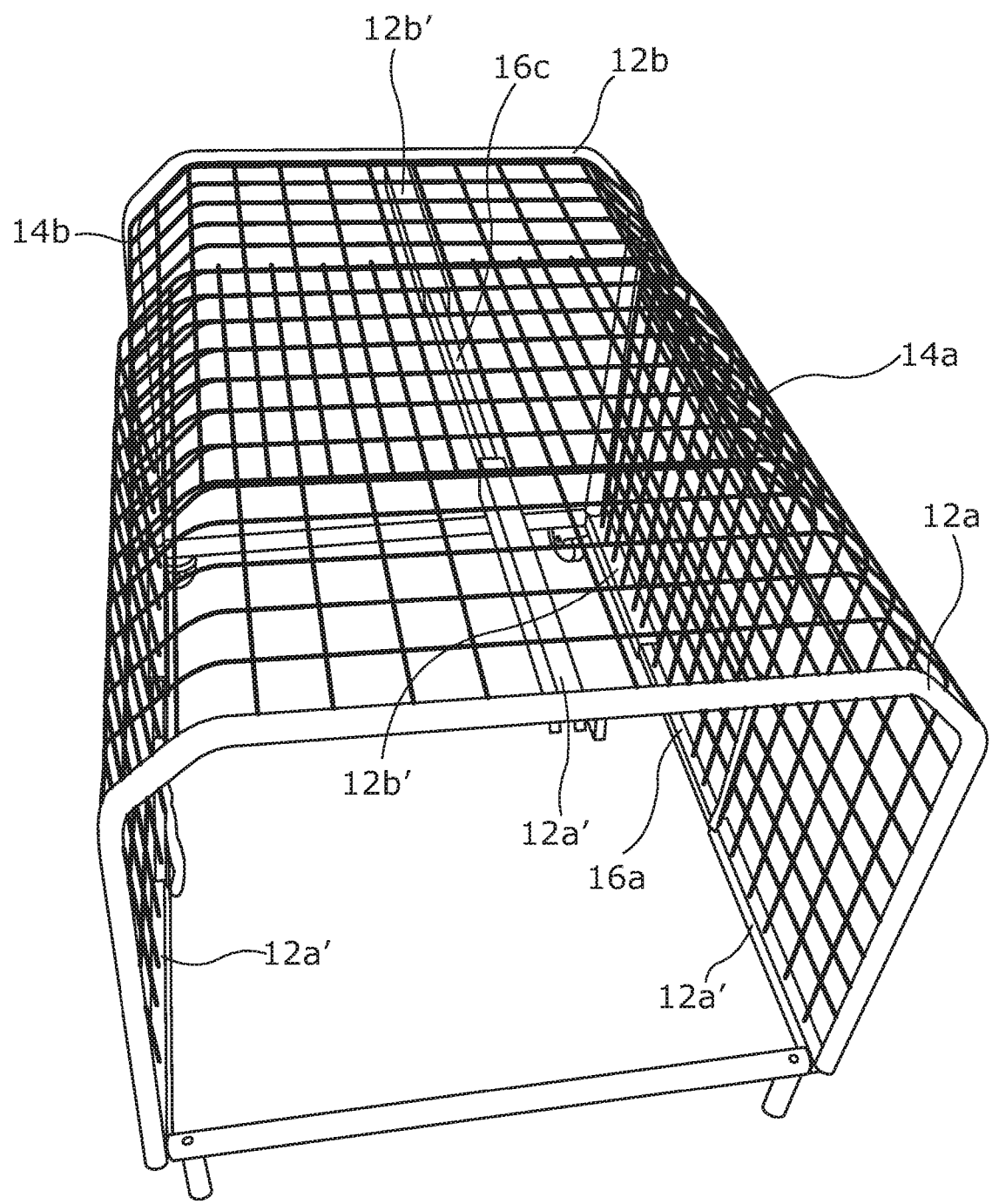
FIG. 6—shows the extendible enclosure of FIG. 5 from an end view.

In FIGS. 5 and 6, there is shown a different arrangement for an enclosure 10 according to the present invention. In this arrangement, the sliding mechanism comprises a third tubular member 16c arranged to slidingly engage with the first frame member 12a and the second frame member 12b via additional respective longitudinal supports 12a', 12b'. The third tubular member 16c is disposed towards the top of the enclosure 10, adjacent to the first and second mesh canopies 14a, 14b. An advantage of having a third tubular member 16c is that it provides additional structural strength to the top of the enclosure 10, and mitigates against damage to the mesh canopies 14a, 14b.

The third tubular member 16c has the same construction as the other two tubular members 16a, 16b and the additional longitudinal supports 12a', 12b' serve as respective guides to receive the third tubular member 16c in sliding engagement.

As will be appreciated from the foregoing embodiments, the present invention is able to provide a safe and reliable, easy to install, and cost-effective means of enclosing objects such as tools, equipment and machinery. However, it will be recognised that one or more of the principles of the invention may extend to other applications, whereby it is required to enclose, retain or cordon off a particular object, space or volume. Therefore, the present extendible enclosure may find use as an animal cage (e.g. for dogs, cats, birds etc.), or as an animal feeding cage; a horticultural cage (e.g. for plants, flowers, vegetables etc.); for storing gas cylinders or wet spraying equipment; or for chemical or medical use; for timber or coal storage; for tool cages; for enclosing computers, servers or displays; as a CCTV camera cage; as an industrial refrigerator cage; a music speaker cage; or for enclosing safes, and indeed anywhere where safety and/or security are a consideration. In such cases, it will typically be necessary to close each of the faces via mesh or some other material, depending on what is to be enclosed.

Of course, it is to be understood that the dimensions of the enclosure are inherently scalable, and therefore the enclosure can be sized to accommodate any particular requirement depending on the desired use and/or implementation. Hence, none of the embodiments or examples disclosed herein are to be taken to be limiting on the dimensions of the enclosure.

Thus, the above embodiments are described by way of example only. Many variations are possible without departing from the invention.

The invention claimed is:

1. An extendible enclosure, comprising:
a first frame member supporting a first mesh canopy;
a second frame member supporting a second mesh canopy; and
a sliding mechanism coupling the first frame member to the second frame member and operable to reversibly extend the enclosure between a first contracted position and a second extended position,
wherein the first mesh canopy is larger than the second mesh canopy, and wherein the first frame member is configured to slidingly engage with the second frame member so that the second frame member at least partially nests within the first frame member when in the first contracted position, wherein the first frame member and the second frame member each have an open base, and wherein at least one of the first and second frame members comprises two wheels or castors and two supporting feet.

2. The extendible enclosure of claim 1, wherein the sliding mechanism comprises a pair of tubular members, each tubular member slidingly engaging with the first frame member and the second frame member, wherein at least one of the mesh canopies comprises a pivotable flap, hatch or door to allow access to the interior of the enclosure.

3. The extendible enclosure of claim 2, wherein the first frame member and the second frame member are configured to receive each tubular member in a respective guide, rail or runner.

4. The extendible enclosure of claim 3, wherein each guide, rail or runner extends substantially along the longitudinal axis of the enclosure.

5. The extendible enclosure of claim 2, wherein each tubular member comprises at least one locking mechanism to lock the first frame member in a position relative to the second frame member.

6. The extendible enclosure of claim 5, wherein the locking mechanism comprises at least one bolt and wing nut.

7. The extendible enclosure of claim 2, wherein the sliding mechanism comprises a third tubular member arranged to slidingly engaging with the first frame member and the second frame member.

8. The extendible enclosure of claim 7, wherein the third tubular member is disposed towards the uppermost part of the enclosure adjacent to the first and second mesh canopies.

9. The extendible enclosure of claim 2, wherein the first mesh canopy at least partially encloses the first frame member.

10. The extendible enclosure of claim 2, wherein the second mesh canopy at least partially encloses the second frame member.

11. The extendible enclosure of claim 2, wherein the first and second frame members are each open at both ends.

12. The extendible enclosure of claim 2, wherein at least one of the mesh canopies comprises a pivotable flap, hatch or door to allow access to the interior of the enclosure.

13. The extendible enclosure of claim 1, wherein the first mesh canopy at least partially encloses the first frame member.

14. The extendible enclosure of claim 1, wherein the second mesh canopy at least partially encloses the second frame member.

15. The extendible enclosure of claim 1, wherein the second frame member fully nests within the first frame member when in the first contracted position.

16. The extendible enclosure of claim 1, wherein the first and second frame members are each open at both ends.

17. The extendible enclosure of claim 1, wherein the longitudinal dimension of the enclosure ranges from about 50 cm to about 120 cm.

18. The extendible enclosure of claim 1, wherein at least one of the mesh canopies comprises a pivotable flap, hatch or door to allow access to the interior of the enclosure.

* * * * *